United States Patent
Ohashi et al.

(10) Patent No.: US 11,868,705 B2
(45) Date of Patent: Jan. 9, 2024

(54) ASSOCIATING DOCUMENT PART WITH ANOTHER DOCUMENT

(71) Applicant: FUJIFILM BUSINESS INNOVATION CORP., Tokyo (JP)

(72) Inventors: Jun Ohashi, Kanagawa (JP); Yohei Uchiumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 483 days.

(21) Appl. No.: 16/821,066

(22) Filed: Mar. 17, 2020

(65) Prior Publication Data
US 2021/0089708 A1    Mar. 25, 2021

(30) Foreign Application Priority Data
Sep. 20, 2019   (JP) ................................. 2019-171232

(51) Int. Cl.
*G06F 40/166* (2020.01)
*G06F 40/106* (2020.01)

(52) U.S. Cl.
CPC .......... *G06F 40/166* (2020.01); *G06F 40/106* (2020.01)

(58) Field of Classification Search
None
See application file for complete search history.

(56) References Cited

U.S. PATENT DOCUMENTS

| | | | |
|---|---|---|---|
| 5,787,448 A * | 7/1998 | Anderson | G06F 9/543 715/205 |
| 7,596,766 B1 * | 9/2009 | Sharma | G06F 3/0481 715/713 |
| 9,372,859 B1 * | 6/2016 | Maeng | G06F 40/103 |
| 2006/0230333 A1 * | 10/2006 | Racovolis | G06F 40/137 715/205 |
| 2013/0097490 A1 * | 4/2013 | Kotler | G06F 16/4393 715/255 |
| 2016/0259508 A1 * | 9/2016 | Eccleston | G06F 40/197 |
| 2017/0199657 A1 * | 7/2017 | Mullins | G06F 3/0482 |
| 2017/0308511 A1 * | 10/2017 | Beth | G06F 40/169 |
| 2018/0189369 A1 * | 7/2018 | Baek | G06F 16/219 |

FOREIGN PATENT DOCUMENTS

| | | | |
|---|---|---|---|
| JP | 2004-151899 A | 5/2004 | |
| JP | 2004-199484 A | 7/2004 | |

(Continued)

OTHER PUBLICATIONS

Wu et al., "Modeling and Implementing Collaborative Editing Systems with Transactional Techniques" CollaborateCom 2010, IEEE, pp. 1-10. (Year: 2010).*

(Continued)

*Primary Examiner* — Amelia L Tapp
(74) *Attorney, Agent, or Firm* — Oliff PLC

(57) ABSTRACT

An information processing apparatus includes a processor configured to: associate, with an edited part of a first document displayed on a display, information indicative of a second document different from the first document in a case where the second document is open on a document display application when the first document is edited; and display the information indicative of the second document on the display when the edited part is selected.

13 Claims, 11 Drawing Sheets

(56) References Cited

FOREIGN PATENT DOCUMENTS

JP          2004-199485 A    7/2004
JP          2014-021508 A    2/2014

OTHER PUBLICATIONS

Jain et al., "VisualDiff: Document Image Verification and Change Detection" 2013 12th International Conference on Document Analysis and Recognition, © 2013 IEEE, pp. 40-44. (Year: 2013).*
Apr. 18, 2023 Office Action issued in Japanese Application No. 2019-171232.
Aug. 15, 2023 Office Action issued in Japanese Patent Application No. 2019-171232.

* cited by examiner

ASSOCIATING DOCUMENT PART WITH ANOTHER DOCUMENT

CROSS-REFERENCE TO RELATED APPLICATIONS

This application is based on and claims priority under 35 USC 119 from Japanese Patent Application No. 2019-171232 filed Sep. 20, 2019.

BACKGROUND

(i) Technical Field

The present disclosure relates to an information processing apparatus and a non-transitory computer readable medium.

(ii) Related Art

Conventionally, techniques for retrieving information that interest a reader from an electronic document have been proposed.

For example, Japanese Unexamined Patent Application Publication No. 2004-199484 discloses an information processing apparatus for retrieving an annotation made in the same viewpoint as a designated annotation for retrieval from an electronic document with annotations, which are additional information. Japanese Unexamined Patent Application Publication No. 2004-199485 discloses an information processing apparatus for retrieving an annotation made by a specific editor from an electronic document with annotations, which are additional information.

SUMMARY

An editor who edits a first document, which is an electronic document to be edited, sometimes refers to a second document, which is another document opened on a document display application. In such a case, a reader who reads the first document that has been edited may want to know the second document which the editor referred to when editing the first document.

Aspects of non-limiting embodiments of the present disclosure relate to allowing a reader who reads a first document which an editor edited while referring to a second document that is open on a document display application to know the second document without the need for an editors operation.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: associate, with an edited part of a first document displayed on a display, information indicative of a second document different from the first document in a case where the second document is open on a document display application when the first document is edited; and display the information indicative of the second document on the display when the edited part is selected.

BRIEF DESCRIPTION OF THE DRAWINGS

An exemplary embodiment of the present disclosure will be described in detail based on the following figures, wherein.

DETAILED DESCRIPTION

Figure 1:
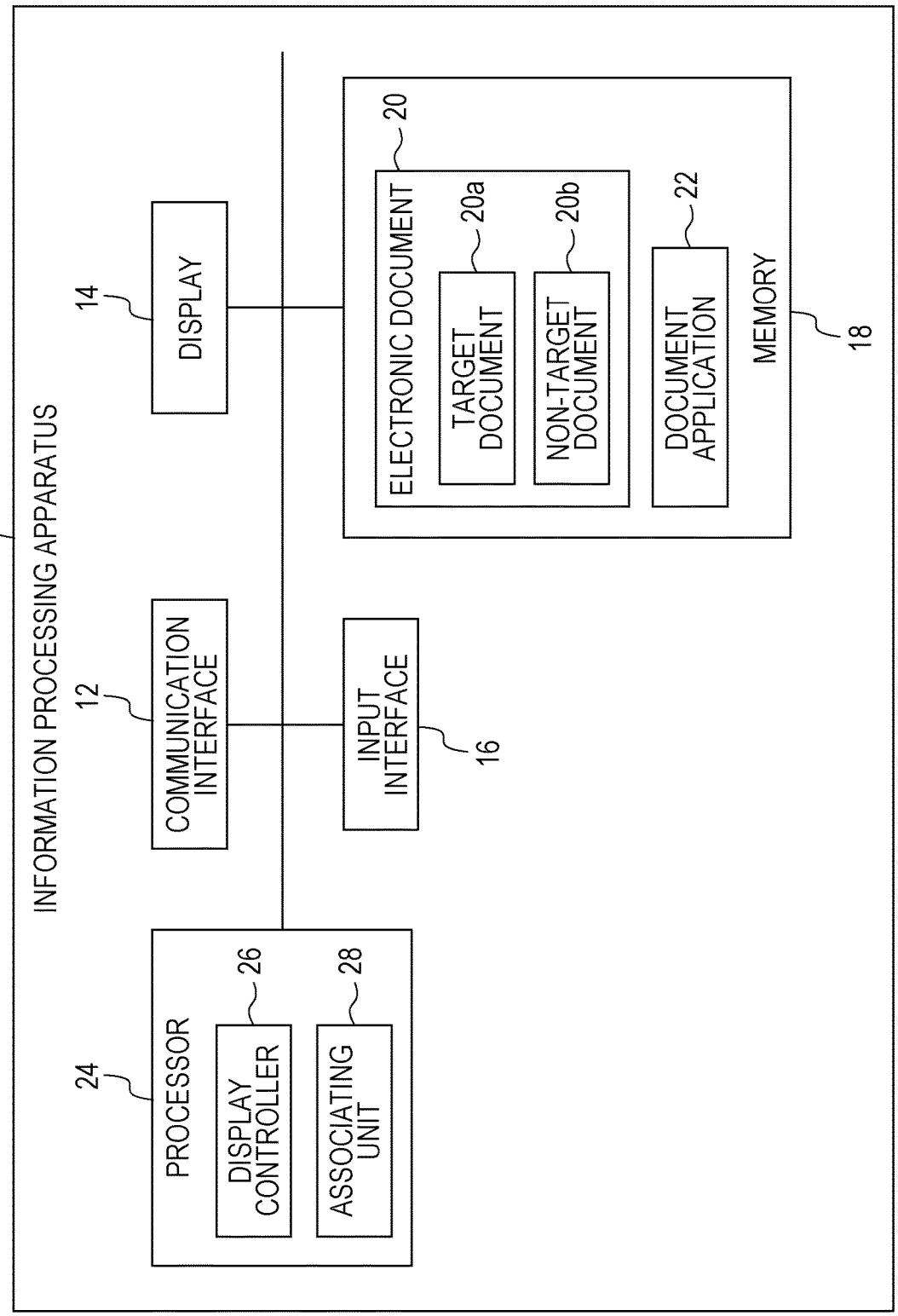
FIG. 1 schematically illustrates a configuration of an information processing apparatus according to the present exemplary embodiment.

FIG. 1 schematically illustrates a configuration of an information processing apparatus 10 according to the present exemplary embodiment. In the present exemplary embodiment, the information processing apparatus 10 is a personal computer. Note, however, that the information processing apparatus 10 may be any apparatus that has functions described below. For example, the information processing apparatus 10 may be a mobile terminal such as a tablet PC or a smartphone.

The information processing apparatus 10 is a terminal used by an editor of an electronic document. The information processing apparatus 10 is also a terminal used by a reader who reads an electronic document edited by the editor. Although the present exemplary embodiment discusses such a case where both of the editor and the reader use the information processing apparatus 10, the editor and the reader may use different information processing apparatuses 10. Specifically, the editor may edit an electronic document by using a first information processing apparatus 10, the edited electronic document may be transmitted from the first information processing apparatus 10 to a second information processing apparatus 10, and a reader may read the edited electronic document on the second information processing apparatus 10. Hereinafter, the editor and the reader are collectively referred to as an operator or a user when they need not be distinguished from each other.

A communication interface 12 includes, for example, a wired or wireless LAN adapter. The communication interface 12 functions to communication with another apparatus over a communication line such as a LAN or the Internet. For example, the information processing apparatus 10 can transmit and receive an electronic document to and from another apparatus through the communication interface 12.

A display 14 includes, for example, a liquid crystal display. Various screens are displayed on the display 14. In particular, a screen of a document application 22, which will be described later, is displayed on the display 14.

An input interface 16 includes, for example, a mouse, a keyboard, and/or a touch panel. The input interface 16 is used by a user to enter an instruction given to the information processing apparatus 10.

A memory 18 includes, for example, a hard disk, a solid state drive (SSD), an embedded Multi Media Card (eMMC), a ROM, or a RAM. The memory 18 may be provided separately from a processor 24, which will be described later, or at least part of the memory 18 may be provided in the processor 24. In the memory 18, an information processing program for causing each unit of the information processing apparatus 10 to operate is stored.

As illustrated in FIG. 1, electronic documents 20 are stored in the memory 18. The electronic documents 20 may be created by using the information processing apparatus 10 or may be received from another apparatus through the communication interface 12. In the present exemplary embodiment, each of the electronic documents 20 is made up or one or more pages. Note that the "pages" as used herein refer to conceptual pages defined in the electronic document 20 and are a concept different from physical pages each printed on a single face of a printing medium when the electronic document 20 is actually printed.

As described above, the editor edits an electronic document 20 by using the information processing apparatus 10. In the present exemplary embodiment, the editor edits the electronic document 20 by referring to another electronic document 20.

Hereinafter, an electronic document 20 that is a first document to be edited by the editor is referred to as a target document 20a, and another electronic document 20 that is a second document different from the target document 20a is referred to as a non-target document 20b. The target document 20a may be any data that can be edited by the editor by using the information processing apparatus 10. For example, the target document 20a may be document data, image data, or program data. The non-target document 20b may be any data which the editor can refer to when editing the target document 20a. The non-target document 20b may be uneditable. The non-target document 20b may also be document data, image data, or program data.

A document application 22 is installed into the memory 18. The document application 22 is an application that can operate on the information processing apparatus 10. The document application 22 is an application for displaying the electronic documents 20 on the display 14 and editing an electronic document 20 (especially the target document 20a in the present exemplary embodiment). The document application 22 can be, for example, Docuworks offered by Fuji Xerox Co., Ltd. Note, however, that the document application 22 operating on the information processing apparatus 10 used by the editor can be any application on which the electronic document 20 can be displayed and edited. The document application 22 operating on the information processing apparatus 10 used by the reader may be any application on which the electronic document 20 can be displayed.

Figure 2:
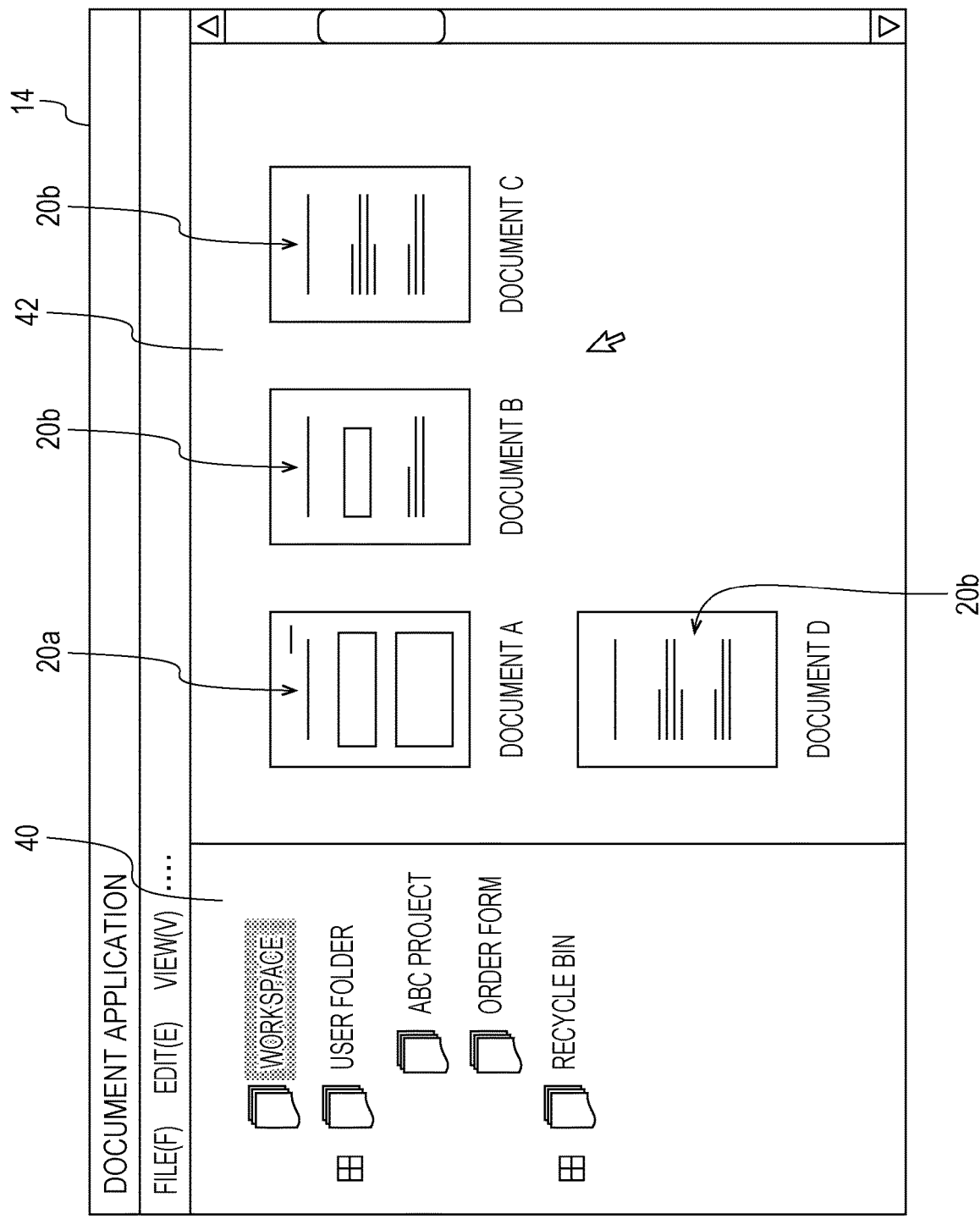
FIG. 2 illustrates a first screen of a document application.

FIG. 2 illustrates a first screen displayed on the display 14 during execution of the document application 22. On the first screen, a window of the document application 22 is displayed. The window includes a folder pane 40 in which a folder structure in the information processing apparatus 10 is shown and a document pane 42 in which a list of thumbnails of electronic documents 20 stored in a folder selected in the folder pane 40 is shown.

The folder structure displayed in the folder pane 40 may be defined by a file system (e.g., Explorer offered by Microsoft Corporation) of the information processing apparatus 10. For example, the user folder and the ABC project folder and order form folder, which are subfolders of the user folder, in FIG. 2 are folders defined by the file system of the information processing apparatus 10. On the document application 22 of the present exemplary embodiment, a work space folder, which is a folder exclusively for the document application 22, is available.

The work space folder is a work document storage region for an electronic document used for work which the user is currently tackling. Specifically, the work space folder simulates a user□s workspace (e.g., a desktop) and allows the user to grasp the whole work which the user is currently tackling at a glance, that is, provides easier and quicker grasp of the work. This makes a contrast with a hierarchical structure made up of a common folder (e.g., the user folder described above) that can be used on other applications and subfolders thereof since the hierarchical structure is for organizing electronic documents 20. When work space folder is selected in the folder pane 40, a workspace simulating a desktop is displayed in the document pane 42, and electronic documents 20 stored in the work space folder are concurrently displayed (as a list of thumbnails in the present exemplary embodiment) in the workspace.

To keep easy and quick grasp of work, only the electronic documents 20 are stored in the work space folder. That is, the work space folder does not have a hierarchical structure including subfolders. If the work space folder has a hierarchical structure, it is impossible to display all of the electronic documents 20 used for current work on a single workspace at once. In this case, an operation for moving from one layer to another is needed to get a full picture of the work space folder. Meanwhile, the work space folder has a flat structure in which only the electronic documents 20 are stored. This allows all of the electronic documents 20 stored in the work space folder to be displayed at once on the workspace without forcing the user to move from one layer to another.

The work space folder is used as a temporary workspace. Meanwhile, for storage of the electronic documents 20, a hierarchical structure is used in which the electronic documents 20 are organized in common folders.

The work space folder does not assume access from the file system of the information processing apparatus 10. Copy of an electronic document 20 to the work space folder, movement of an electronic document 20 from the work space folder to another folder, and deletion of an electronic document 20 from the work space folder can be executed only on the document application 22. When an electronic document 20 is copied to the work space folder from another folder on the document application 22, information indicative of the folder from which the electronic document 20 was copied is added to this electronic document 20. This makes it possible to perform processing on the electronic document 20 stored in the work space folder by using attributes of the place from which the electronic document 20 was copied. For example, in a case where the information shows that the electronic document 20 was originally stored in the ABC project folder, the user can know that the electronic document 20 is data concerning an ABC project.

Assume that a need to execute different work of a higher priority on the workspace arises when the user is tackling work on the workspace. In this case, efficiency of user□s work is heightened if electronic documents 20 for the current work on the workspace can be put away (evacuated)

to somewhere, and electronic documents 20 for new work can be placed on the workspace thus emptied. Furthermore, it is convenient if the electronic documents 20 that was put away can be displayed again on the workspace after completion of the interrupting work so that the user can resume the interrupted work.

In view of this, the document application 22 has a function of clearing the workspace. When the user gives an instruction to execute the clearing function, the document application 22 creates an evacuation folder and stores electronic documents 20 displayed on the workspace in the evacuation folder. In the present exemplary embodiment, the evacuation folder is a subfolder of the work space folder. This is an exception of a principle that the work space folder has no subfolder therein. The evacuation folder has a limited role as a folder for temporary evacuation from the workspace, unlike a folder that constitutes a hierarchical structure for organizing documents. In this example, only the evacuation folder is permitted to be located beneath the work space folder. Note that the evacuation folder being located "beneath" the work space folder has no special meaning unlike a folder that constitutes a hierarchical structure for organizing documents. The evacuation folder need not be located beneath the work space folder if, for example, attribute information of the evacuation folder shows that the evacuation folder is a folder to which documents on the workspace are put away.

The electronic documents 20 stored in the evacuation folder can be displayed again on the workspace based on an instruction from the user.

In the present exemplary embodiment, it is assumed that at least some of the non-target documents 20b and the target document 20a are stored in the work space folder. For example, it is assumed that four electronic documents 20 (documents A through D) are stored in the work space folder as illustrated in FIG. 2 and that the document A is the target document 20a and the documents B through D are non-target documents 20b. Note that the target document 20a and the non-target documents 20b need not necessarily be stored in the work space folder.

Figure 3:
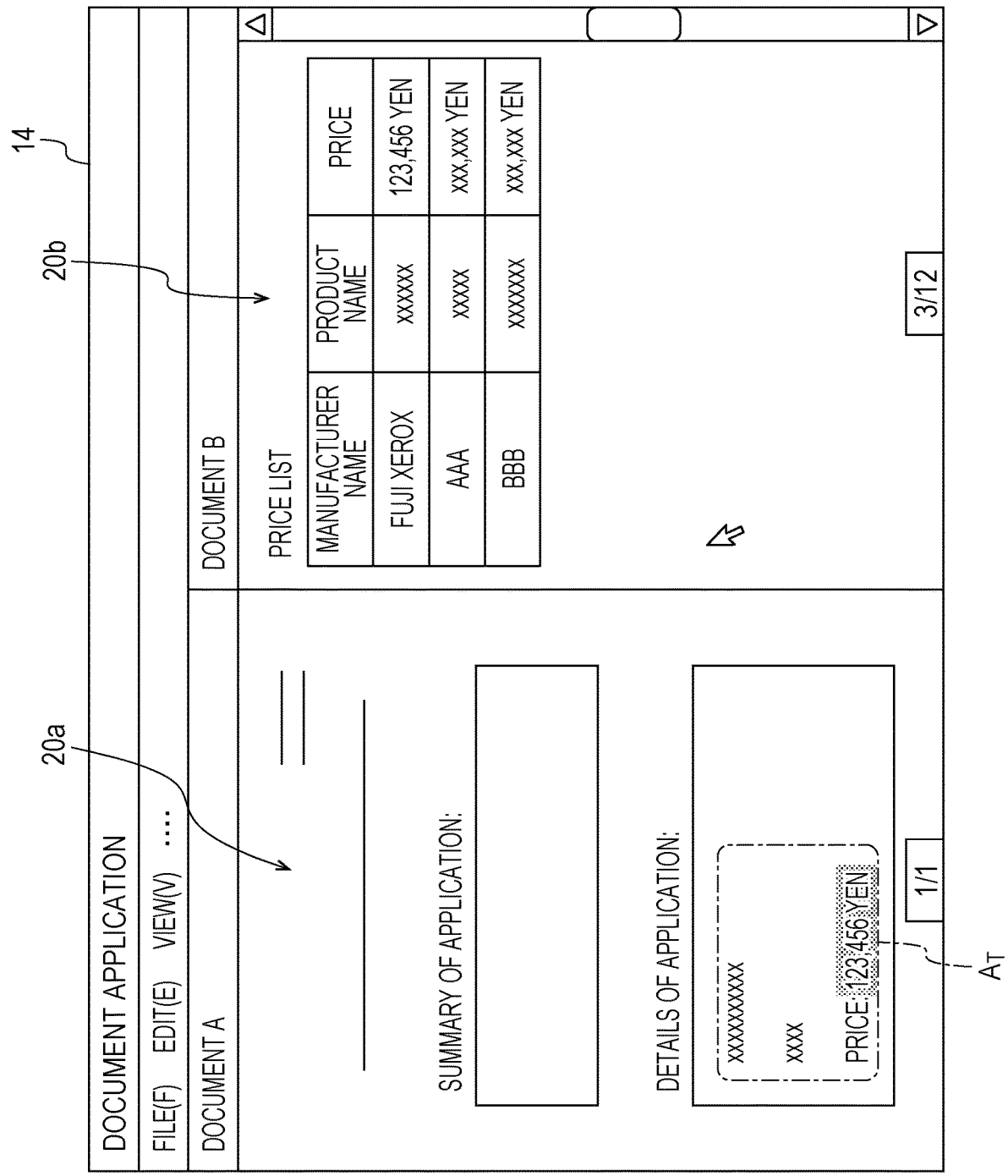
FIG. 3 illustrates a screen on which a target document and a reference document are displayed.

When the user selects an electronic document 20 displayed on the document pane 42, for example, by double-clicking, the selected electronic document 20 is displayed. As illustrated in FIG. 3, plural electronic documents 20 can be displayed concurrently (side by side). In a case where plural electronic documents 20 are opened, one of the electronic documents 20 may be displayed in a full screen mode while the other electronic document(s) 20 is(are) opened in the background, and the displayed electronic document 20 may be switched to another electronic document 20 upon receipt of an instruction from a user. In a case where the target document 20a and the non-target document 20b are opened concurrently, the editor can edit the target document 20a while referring to the non-target document 20b.

On the document application 22, the editor edits the target document 20a by adding an annotation of various kinds to the target document 20a as additional information. Examples of the annotation include an additional annotation for adding a new object to the target document 20a and an attribute annotation for adding an attribute to an element in the target document 20a. Examples of the kind of additional annotation include a text annotation for adding a text, a label annotation for adding a label (which may be a label with a text), a figure annotation for adding a figure (e.g., a straight line, a polygonal line, a quadrangle, an ellipse, a polygon, a cloud shape, or a stamp), and an image annotation for adding an image. Examples of the kind of attribute annotation include a marking annotation for adding a marker attribute to a character in the target document 20a, date and time annotation for adding edit date and time information, and a link annotation for adding information on a link to another file.

The target document 20a may be edited by a method other than addition of an annotation. For example, a text in the target document 20a may be directly rewritten.

See FIG. 1 again. The processor 24 is a processing device in a broad sense and includes at least one of a general-purpose processing device (e.g., a central processing unit (CPU)) and a dedicated processing device (e.g., a graphics processing unit (GPU), an application specific integrated circuit (ASIC), a field programmable gate array (FPGA), or a programmable logic device). The processor 24 may be realized not by a single processing device but by cooperation of plural processing devices that are physically separate from one another. The processor 24 achieves functions of a display controller 26 and an associating unit 28 in cooperation with an information processing program stored in the memory 18 as illustrated in FIG. 1.

The display controller 26 controls how to display various screens on the display 14. Specifically, the display controller 26 controls, for example, how to display the window of the document application 22.

The associating unit 28 associates an edited part of the target document 20a with information indicative of a non-target document 20b estimated as a document referred to by the editor when the editor edited the target document 20a on the document application 22. Hereinafter, the non-target document 20b estimated as a document referred to by the editor who edited the target document 20a is referred to as a reference document. In the present exemplary embodiment, the target document 20a and the non-target document 20b are opened on the document application 22, and therefore the associating unit 28 estimates that a non-target document 20b that was open on the document application 22 serving as a document display application when the editor edited the target document 20a is a reference document referred to by the editor and associates information (hereinafter referred to as "reference document information") indicative of the reference document with an edited part of the target document 20a.

For example, assume that the editor adds a text annotation $A_T$ to the document A in a case where the document A, which is the target document 20a, and the document B, which is the non-target document 20b, are displayed concurrently on the display 14 by using the document application 22 as illustrated in FIG. 3. That is, assume that the editor edits the target document 20a. In this case, the associating unit 28 estimates that the document B, which is the non-target document 20b, is a reference document and associates reference document information indicative of the reference document (i.e., the document B, which is the non-target document 20b) with the text annotation $A_T$, which is an edited part.

The reference document information may be associated with the text annotation $A_T$ in any form. In the present exemplary embodiment, the associating unit 28 associates the reference document information as attribute information of the text annotation $A_T$. Examples of the reference document information include, but are not limited to, a file path of the reference document (i.e., positional information indicative of a position of the reference document in the file system of the information processing apparatus 10), part information indicative of a part (e.g., a page) of the reference document that was open on the document application 22 when the editor edited the target document 20*a*, and view mode information indicative of a way (e.g., a full-screen view or a magnification rate) in which the reference document was open on the document application 22 when the editor edited the target document 20*a*. For example, in a case where an in-page part, which is a part within a page of the reference document referred to by the editor, can be specified, the reference document information may include in-page part information indicative of the in-page part as described later.

When a non-target document 20*b* is opened on the document application 22, information on the non-target document 20*b*, such as a file path of the non-target document 20*b*, part information indicative of a part (e.g., page) that is open, and view mode information is stored in a temporary storage region of the memory 18 in a manner such that this information can be recognized as information on the non-target document 20*b* that is currently open on the document application 22. When the target document 20*a* is edited, the associating unit 28 acquires the information on the non-target document 20*b* (i.e., the reference document) that is currently open on the document application 22 from the temporary storage region and associates this information with an edited part as reference document information.

Although the same application (i.e., the document application 22) is used to edit the target document 20*a* and display the non-target document 20*b* in the present exemplary embodiment, different applications may be used to edit the target document 20*a* and display the non-target document 20*b*. In this case, when the target document 20*a* is edited, the associating unit 28 may determine that non-target documents 20*b* that are open on all of other document display applications are reference documents and associate reference document information of these reference documents with an edited part of the target document 20*a*. Alternatively, the associating unit 28 may determine that only a non-target document 20*b* that is open on a predetermined document display application is a reference document and associate reference document information of this reference document with an edited part of the target document 20*a*.

Although the non-target document 20*b* is open on the document application 22 and is displayed on the display 14 when the target document 20*a* is edited in the example of FIG. 3, the non-target document 20*b* determined as a reference document need just be open on the document application 22 and need not necessarily be displayed on the display 14. For example, even in a case where the target document 20*a* is displayed in a full-screen view and the non-target document 20*b* is open in the background, the associating unit 28 may determine that the non-target document 20*b* that is open in the background is a reference document and associate reference document information of this reference document with an edited part when the target document 20*a* is edited. This is because there are cases where the editor opens both of the target document 20*a* and the non-target document 20*b* and edits the target document 20*a* while referring to the non-target document 20*b* by switching a displayed document between the target document 20*a* and the non-target document 20*b*.

In a case where plural non-target documents 20*b* are open on the document application 22 when the target document 20*a* is edited and the associating unit 28 cannot determine which of the non-target documents 20*b* is a reference document, the associating unit 28 may determine that a non-target document 20*b* designated by the editor among the non-target documents 20*b* is a reference document and associate reference document information indicative of this reference document with an edited part of the target document 20*a*.

Figure 4:
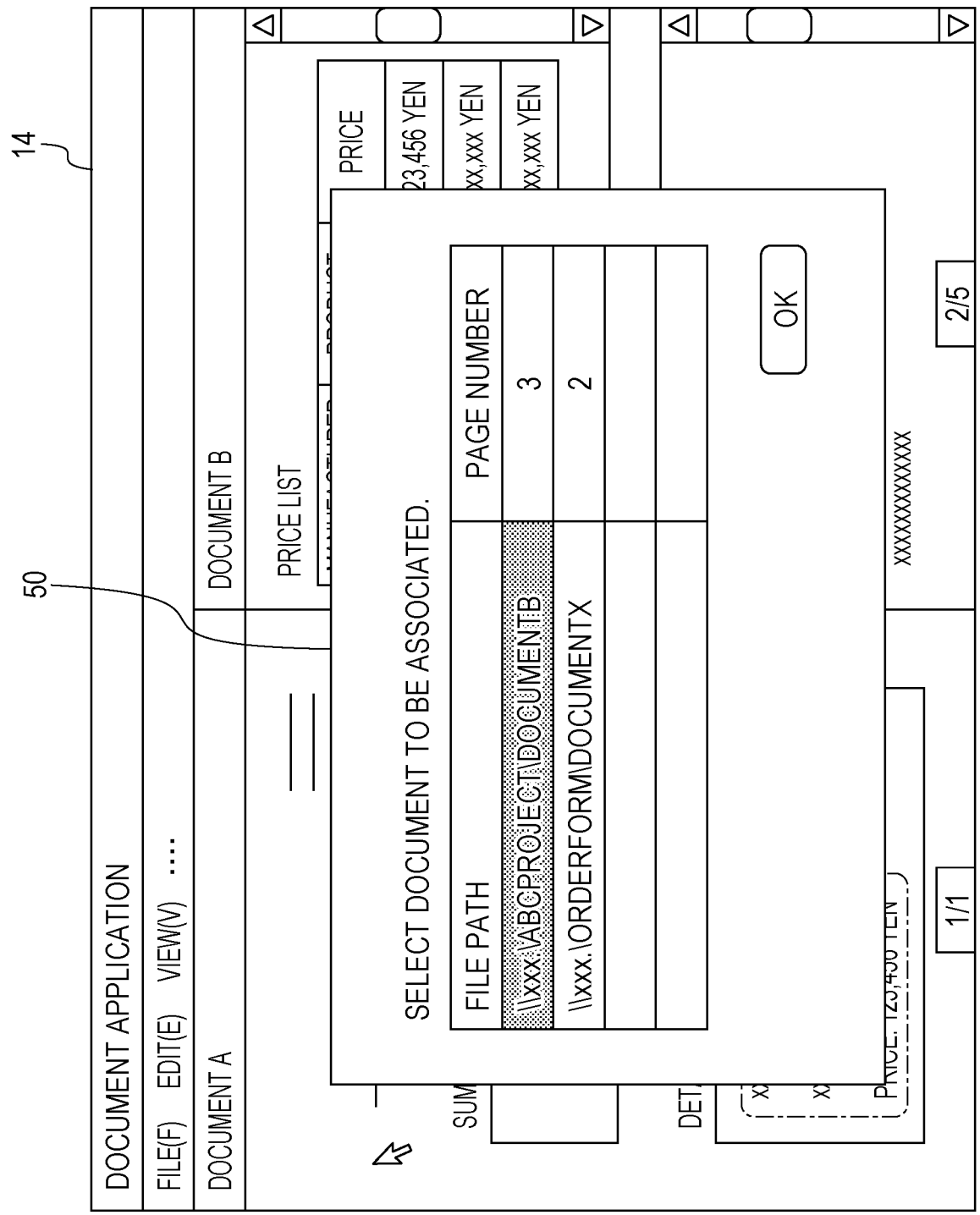
FIG. 4 illustrates a screen on which an associating dialogue is displayed.

The reference document may be designated by the editor in any way. In the present exemplary embodiment, in a case where plural non-target documents 20*b* are open on the document application 22 when the target document 20*a* is edited, the display controller 26 displays, on the display 14, an associating dialogue for causing the editor to designate a reference document as illustrated in FIG. 4.

On the associating dialogue 50, the non-target documents 20*b* that are open on the document application 22 when the target document 20*a* is edited are displayed in a selectable manner. Desirably, information on the non-target documents 20*b* is displayed on the associating dialogue 50. In the example of FIG. 4, file paths and page numbers of the non-target documents 20*b* are displayed. The editor can designate a reference document by selecting a reference document from among the displayed non-target documents 20*b* and then pressing an OK button. Plural reference documents may be selectable on the associating dialogue 50. That is, the editor may designate plural reference documents and associate the plural reference documents with an edited part.

In a case where plural non-target documents 20*b* are open on the document application 22 when the target document 20*a* is edited and the associating unit 28 cannot determine which of the non-target documents 20*b* is a reference document, the associating unit 28 may regard all of the non-target documents 20*b* that are open as reference documents and associate plural pieces of reference document information corresponding to the plural reference documents with an edited part without displaying the associating dialogue 50.

In a case where the target document 20*a* is stored in the work space folder, a non-target document 20*b* determined as a reference document may be limited to a non-target document 20*b* stored in the work space folder. That is, in a case where a first non-target document 20*b* stored in the work space folder and a second non-target document 20*b* stored in a folder different from the work space folder are open on the document application 22 when the target document 20*a* is edited, the associating unit 28 may determine that the first non-target document 20*b* stored in the work space folder is a reference document.

Figure 5:
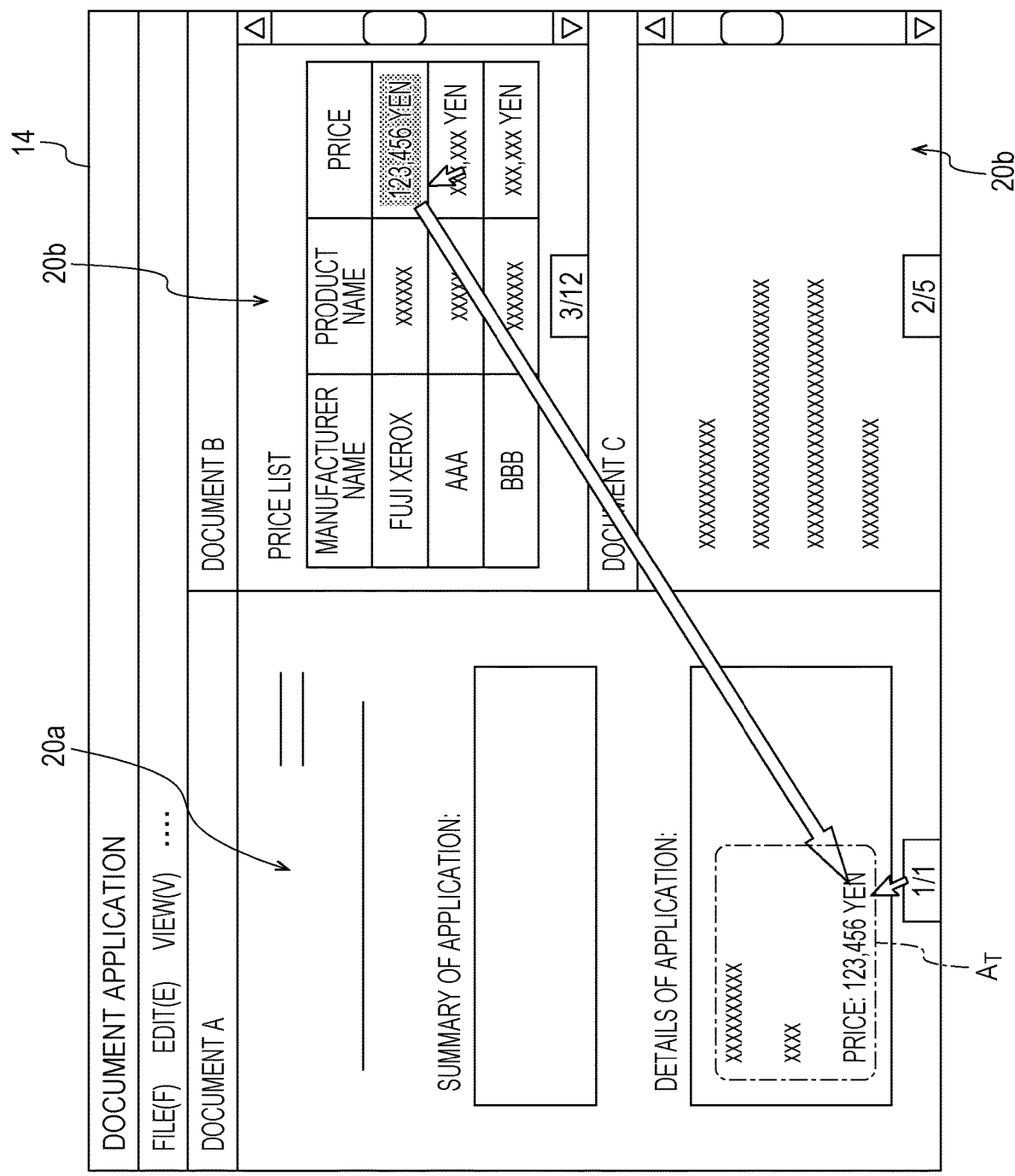
FIG. 5 illustrates how a part of a reference document is copied to a target document.

On the document application 22, at least a part of a non-target document 20*b* can be copied to the target document 20*a*. This copying operation is, for example, an operation of designating a part of or all of the non-target document 20*b*, registering the designated part in a predetermined clipboard (e.g., pressing a Ctrl key and a C key of the keyboard), designating a part of the target document 20*a* to be edited, and then pasting the designated part (e.g., pressing the Ctrl key and a V key of the keyboard). Alternatively, as illustrated in FIG. 5, the copying operation may be an operation (i.e., a drag-and-drop operation) of selecting a part of the non-target document 20*b*, pressing a left button of the mouse on the selected part, moving a mouse cursor to a part of the target document 20*a* to be edited while pressing the left button of the mouse, and then releasing the left button on this part of the target document 20*a*. In the example of FIG. 5, a character string "123,456 yen" of the non-target document 20*b* is a part to be copied, and this character string is dragged to the text annotation $A_T$, which is a part of the target document 20*a* to be edited, and is then dropped at the text annotation $A_T$. In this way, the character string "123,456 yen" is copied to the text in the text annotation $A_T$.

In a case where at least a part of the non-target document 20b was copied to the target document 20a, it can be said that the editor edited the target document 20a while referring to this non-target document 20b. That is, it can be said that the non-target document 20b from which the part was copied is a reference document. Accordingly, in a case where plural non-target documents 20b are open on the document application 22 and at least a part of one of the non-target documents 20b is copied to the target document 20a, the associating unit 28 determines that the one of the non-target documents 20b is a reference document and associates reference document information of this reference document with an edited part of the target document 20a.

In particular, in a case where an in-page part, which is a part within a page of the non-target document 20b, was copied, it can be said that the editor edited the target document 20a while referring to the in-page part of the non-target document 20b. That is, in this case, the associating unit 28 can narrow a reference source referred to by the editor down to the part within the page of the non-target document 20b. Accordingly, in a case where an in-page part, which is a part within a page of the non-target document 20b, is copied, the associating unit 28 may associate reference document information including in-page part information indicative of the in-page part of this non-target document 20b, which is a reference document, with an edited part of the target document 20a. Note that the in-page part information indicative of the in-page part may be, for example, text data indicative of a copied character string in the reference document or positional information (e.g., relative coordinate information) indicative of a position of the in-page part.

Some non-target documents 20b may have been already edited so that an attribute is added to a part thereof. For example, an attribute annotation described above may have been already added to at least a part of a non-target document 20b. In this case, in a case where an attribute of the same kind as the attribute that has been already added to the at least part of the non-target document 20b is added to an edited part of the target document 20a that has the same contents as the at least part of the non-target document 20b, it can be said that it is highly likely that the editor has added the similar attribute to the target document 20a while referring to the non-target document 20b.

Accordingly, in a case where plural non-target documents 20b are open on the document application 22 and an attribute of the same kind as an attribute that has been already added to at least part of one of the non-target documents 20b is added to an edited part of the target document 20a that has the same contents as the at least part of the one of the non-target documents 20b, the associating unit 28 determines that the one of the non-target documents 20b is a reference document and associates reference document information of this reference document with the edited part of the target document 20a.

Figure 6:
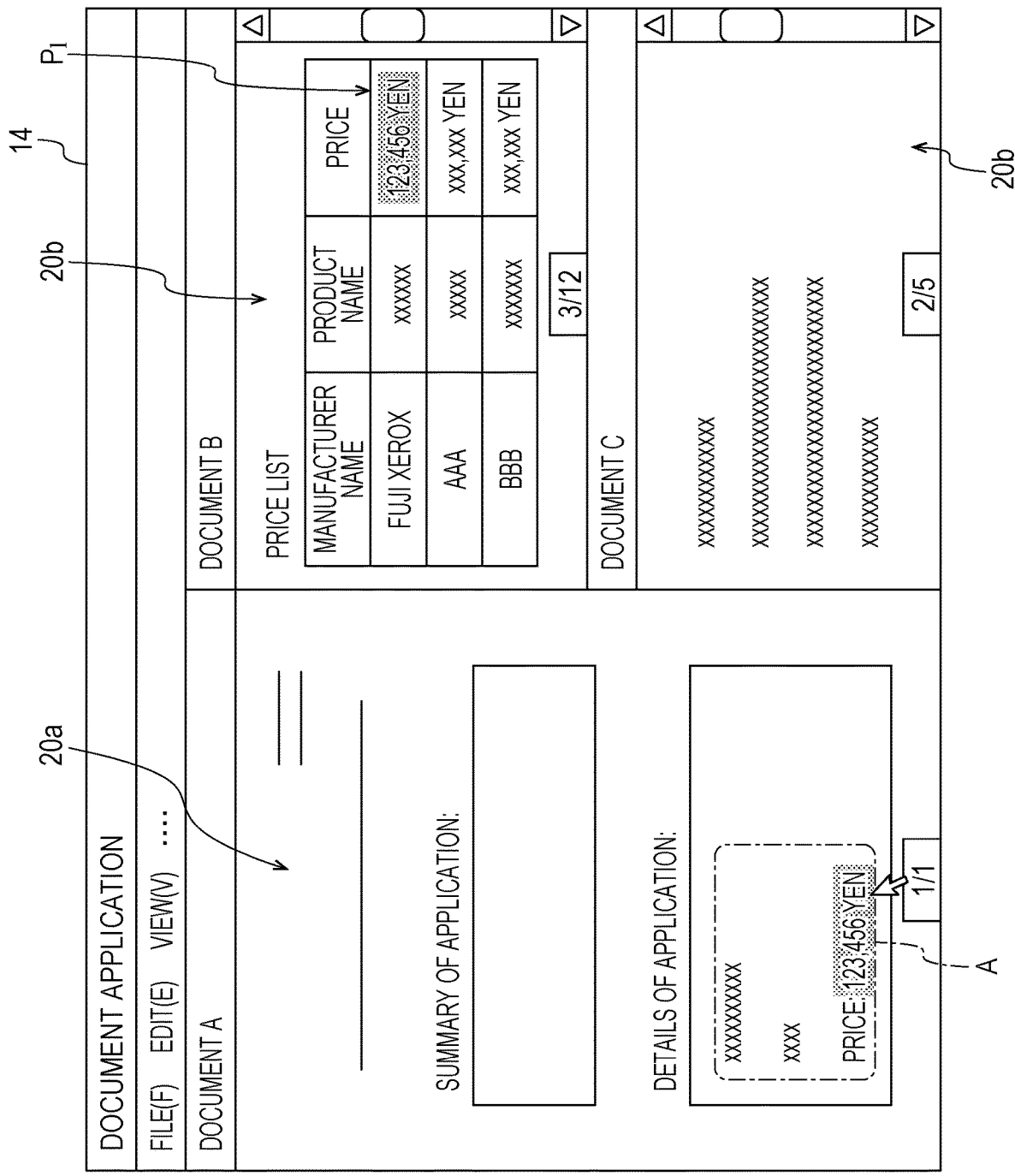
FIG. 6 illustrates how the same attribute as an attribute added to a part of a reference document is added to a target document.

In the present exemplary embodiment, adding an attribute of the same kind as an attribute that has been already added to a non-target document 20b means adding an attribute annotation of the same kind as an attribute annotation that has been already added to the non-target document 20b. For example, as illustrated in FIG. 6, in a case where a marking annotation has been already added to a character string "123,456 yen", which is a part $P_1$ of a non-target document 20b and the editor adds a marking annotation to a character string "123,456 yen" included in the text annotation $A_T$ of the target document 20a, which has the same contents as the part $P_1$, the associating unit 28 determines that the non-target document 20b is a reference document. Note that in this case, even in a case where characteristics such as a color and a size of the marking annotation added to the edited part are different from those of the marking annotation added to the part $P_1$, the associating unit 28 may determine that an attribute of the same kind as the part $P_1$ has been added to the edited part.

In particular, in a case where an attribute of the same kind as an attribute that has been already added to an in-page part of a non-target document 20b, which is a part within a page of the non-target document 20b, is added to an edited part of the target document 20a that has the same contents as the in-page part, it can be said that the editor has edited the target document 20a while referring to the in-page part of the non-target document 20b. That is, in this case, the associating unit 28 can narrow a reference source which the editor referred to down to a part within a page of a non-target document 20b, as in a case where an in-page part of a non-target document 20b is copied to the target document 20a. Accordingly, in a case where an attribute of the same kind as an attribute that has been already added to an in-page part of a non-target document 20b, which is a part within a page of the non-target document 20b, is added to an edited part of the target document 20a that has the same contents as the in-page part, the associating unit 28 may associate reference document information including in-page part information indicative of the in-page part of the non-target document 20b, which is a reference document, with the edited part of the target document 20a.

The associating unit 28 may be configured not to associate reference document information with an edited part of the target document 20a depending on what kind of edit has been made to the edited part of the target document 20a even if a non-target document 20b is open on the document application 22 when the editor edits the target document 20a.

First, the associating unit 28 need not associate reference document information with an edited part of the target document 20a in a case where edit of the edited part is considered to be irrelevant with any non-target document 20b. Examples of such a case include a case where the edit is just to add a date and a time of edit of the target document 20a. In the present exemplary embodiment, in a case where a date and time annotation described above is added to a part of the target document 20a, the associating unit 28 does not associate a reference document with the edited part of the target document 20a.

Second, the associating unit 28 need not associate information on a non-target document 20b with an edited part of the target document 20a in a case where the edit itself of the edited part is one indicating the non-target document 20b. Examples of such a case include a case where the edit is to provide a link to the non-target document 20b on the target document 20a and a case where the edit is to add the non-target document 20b as an attached file to the target document 20a. In the present exemplary embodiment, in a case where a link annotation described above is added to a part of the target document 20a, the associating unit 28 does not associate a reference document with the edited part of the target document 20a.

As described above, when the editor edits a part of the target document 20a, the associating unit 28 determines that a non-target document 20b that is open on the document application 22 when the editor edits the target document 20a is a reference document and automatically associates reference document information indicative of the reference document with the edited part of the target document 20a (without the need for an editors operation).

The following describes processing performed in the information processing apparatus 10 when a reader views the target document 20a. In the following description, it is assumed that the editor has edited the target document 20a while referring to a reference document and that reference document information has been associated with an edited part of the target document 20a.

First, when the reader opens the target document 20a on the document application 22, the display controller 26 displays the target document 20a on the display 14. Note that an application used to open the target document 20a is not limited to the document application 22 and may be any application that has functions described below. In particular, the application used to open the target document 20a may be a document display application that does not have a function of editing the electronic document 20.

Figure 7:
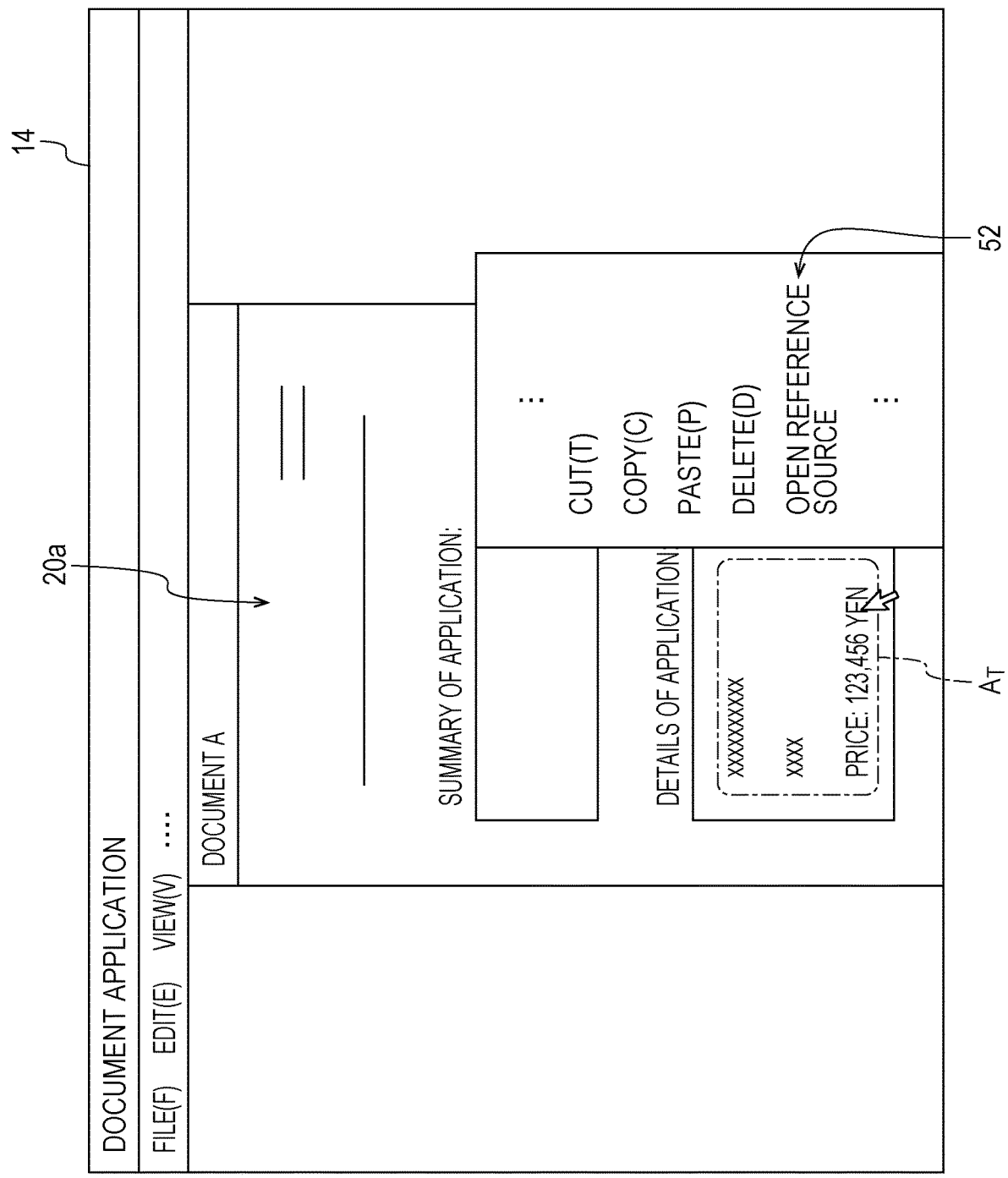
FIG. 7 illustrates a screen on which an edited part has been selected.

When the reader selects the edited part of the target document 20a, the display controller 26 causes reference document information associated with the edited part to be displayed on the display 14. In the present exemplary embodiment, when the reader presses a right button of the mouse while placing a mouse cursor on the text annotation $A_T$, which is the edited part, the display controller 26 causes a context menu 52 to be displayed on the display 14 as illustrated in FIG. 7. The context menu 52 includes an "OPEN REFERENCE SOURCE" button in addition to buttons for typical instructions such as cut, copy, paste, and delete.

Figure 8:
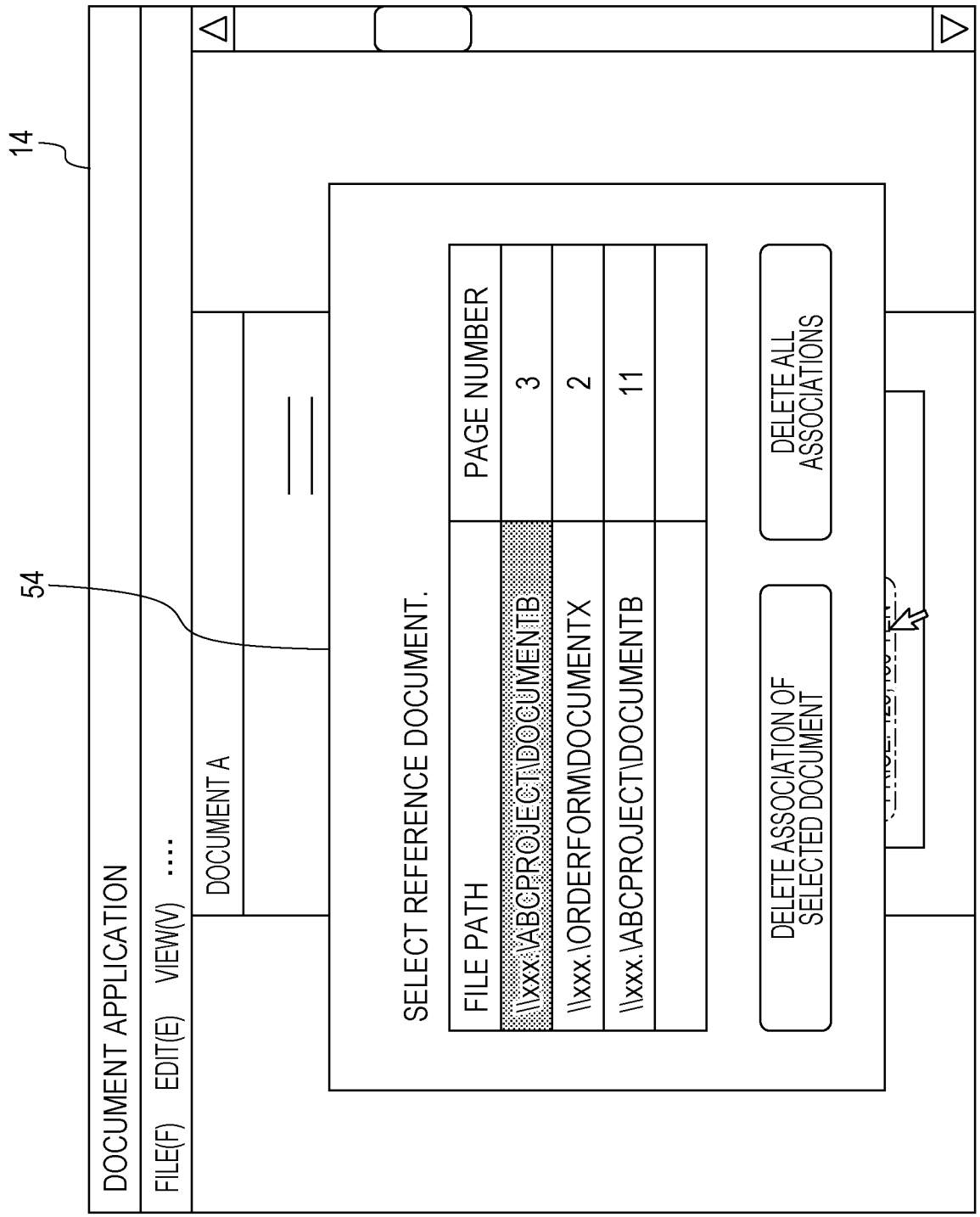
FIG. 8 illustrates a screen on which a reference document selection dialogue is displayed.

When the reader presses the "OPEN REFERENCE SOURCE" button included in the context menu 52, the display controller 26 causes a reference document selection dialogue 54 to be displayed on the display 14 as illustrated in FIG. 8.

On the reference document selection dialogue 54, a list of reference document information indicative of one or more reference documents associated with the text annotation $A_T$, which is the edited part selected by the reader, is displayed. In the present exemplary embodiment, file paths and page numbers of the reference documents are displayed as the reference document information on the reference document selection dialogue 54. Needless to say, information on a reference document displayed on the reference document selection dialogue 54 may include view mode information described above and, in a case where an in-page part of the reference document which the editor referred to has been specified, in-page part information (e.g., a character string or positional information) indicative of the in-page part.

From the file paths of the reference documents displayed on the reference document selection dialogue 54, the reader can know which non-target documents 20b the editor referred to when editing the selected edited part. Furthermore, from the page numbers of the reference documents displayed on the reference document selection dialogue 54, the reader can know which pages of which non-target documents 20b the editor referred to when editing the selected edited part.

Figure 9:
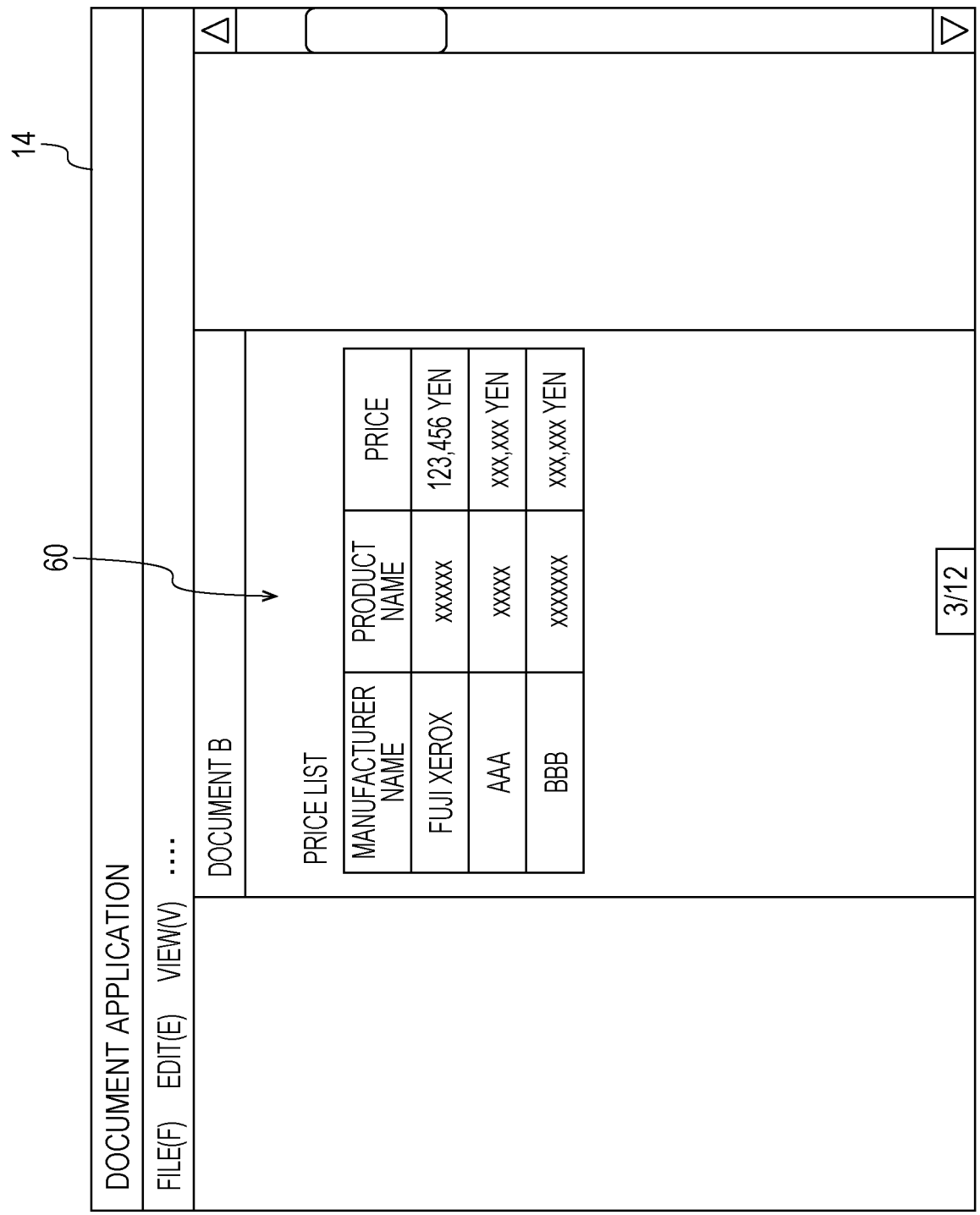
FIG. 9 illustrates a screen on which a reference document is displayed.

Furthermore, when the reader selects any one of the reference documents by double-clicking on the reference document selection dialogue 54, the display controller 26 causes the selected reference document 60 to be displayed on the display 14 as illustrated in FIG. 9. This allows the reader to confirm details of the reference document 60 which the editor referred to when editing the selected edited part. Desirably, the display controller 26 causes a page indicated by a page number included in reference document information of the reference document 60 to be displayed on the display 14. In a case where the reference document information of the reference document 60 includes view mode information, the display controller 26 desirably causes the reference document 60 to be displayed in a view mode indicated by the view mode information. This allows the reader to confirm the reference document 60 in a view mode in which the editor referred to the reference document 60 when editing the selected edited part.

As illustrated in FIG. 8, the reference document selection dialogue 54 may include a "DELETE ASSOCIATION OF SELECTED DOCUMENT" button. When the reader selects any one of the reference documents by clicking the reference document and then presses the "DELETE ASSOCIATION OF SELECTED DOCUMENT" button, the processor 24 of the information processing apparatus 10 deletes association of the selected reference document with the edited part. Furthermore, the reference document selection dialogue 54 may include a "DELETE ALL ASSOCIATIONS" button. When the reader presses the "DELETE ALL ASSOCIATIONS" button, the processor 24 deletes associations of all of the reference documents with the edited part.

In the present exemplary embodiment, when the reader presses the "OPEN REFERENCE SOURCE" button included in the context menu 52 displayed by right-clicking on the edited part, reference document information associated with the edited part is displayed. However, the reference document information may be displayed in a different way. For example, the display controller 26 may cause the reference document information associated with the edited part to be displayed as a pop-up on the display 14 when the reader places a mouse cursor on the edited part.

When the reader selects the edited part, the display controller 26 may cause the reference document 60 itself to be displayed on the display 14 on the basis of reference document information without displaying a file path and a page number of the reference document. In this case, the reference document 60 itself displayed on the display 14 is information on the reference document. It is desirable that the display controller 26 displays a part of the reference document 60 indicated by part information included in the reference document information. In this case, the part (e.g., a page) of the reference document 60 displayed on the display 14 is information on a part of the reference document. Furthermore, it is desirable that the display controller 26 displays the reference document 60 in a mode corresponding to a view mode indicated by view mode information included in the reference document information.

In a case where the reference document information associated with the edited part selected by the reader has in-page part information described above, the display controller 26 desirably emphasizes an in-page part of the reference document 60 indicated by the in-page part information when displaying the reference document 60 on the display 14. This allows the reader to easily know an in-page part which the editor referred to when editing the selected edited part.

Figure 10:
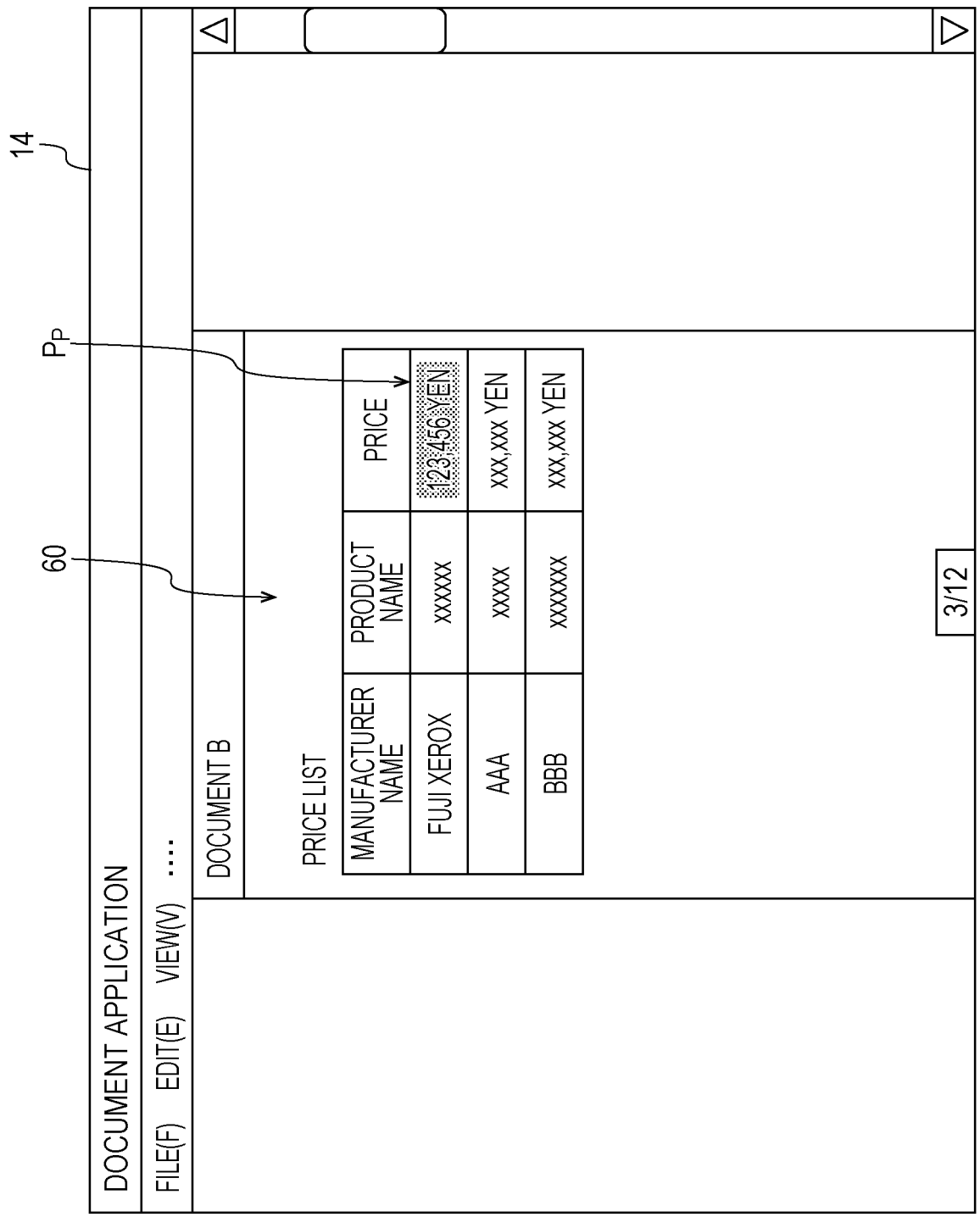
FIG. 10 illustrates a screen on which a part of the reference document is emphasized.

An in-page part Pp of the reference document 60 may be emphasized by marking the in-page part $P_p$ as illustrated in FIG. 10 or may be emphasized by magnifying the reference document 60 so that the in-page part Pp is located at a center of the display 14. Needless to say, the in-page part Pp may be emphasized in any other ways.

Figure 11:
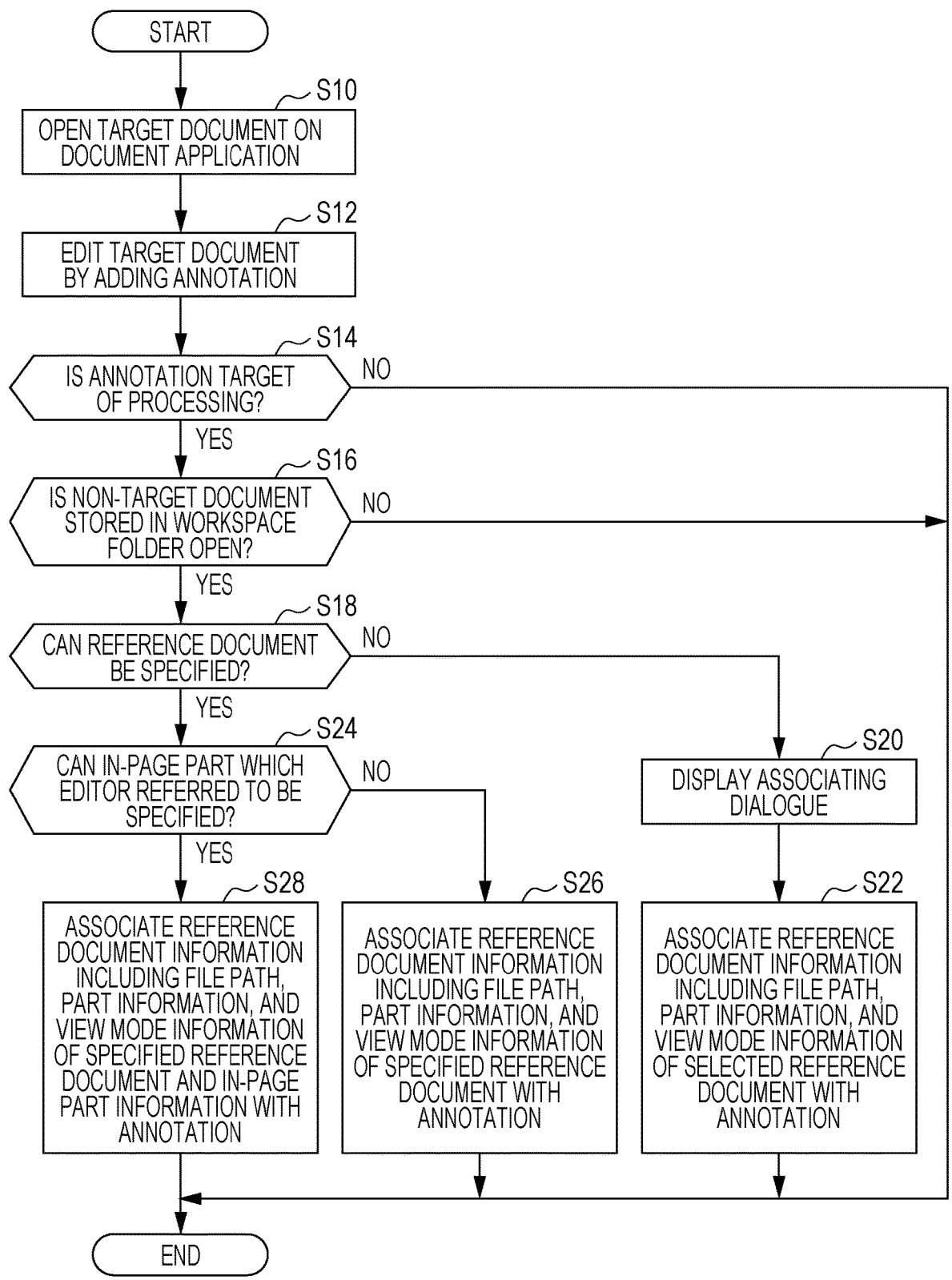
FIG. 11 is a flowchart illustrating flow of processing of the information processing apparatus according to the present exemplary embodiment.

Flow of processing of the information processing apparatus 10 according to the present exemplary embodiment is described below with reference to the flowchart of FIG. 11.

In particular, flow of processing for associating reference document information with an edited part by the associating unit 28 is described below.

In step S10, the editor opens the target document 20a on the document application 22. It is assumed here that the target document 20a is stored in the work space folder.

In step S12, the editor edits a part of the target document 20a. In this example, it is assumed that the editor adds an annotation to a part of the target document 20a.

In step S14, the associating unit 28 determines whether or not the annotation added in step S12 is a target of the processing, that is, whether or not the annotation added in step S12 is a target with which reference document information is to be associated. For example, in a case where this annotation is an annotation (e.g., a date annotation) that is not a target with which reference document information is to be associated, the processing is finished. In a case where the annotation added in step S12 is a target of the processing, step S16 is performed.

In step S16, the associating unit 28 determines whether or not a non-target document 20b stored in the work space folder is open on the document application 22. In a case where there is no non-target document 20b that is open on the document application 22 or in a case where a non-target document 20b is open on the document application 22 but is not one stored in the work space folder, the processing is finished. In a case where a non-target document 20b stored in the work space folder is open on the document application 22, step S18 is performed.

In step S18, the associating unit 28 determines whether or not a reference document which the editor referred to when editing the edited part can be specified. In a case where plural non-target documents 20b are open on the document application 22 and the reference document cannot be specified, step S20 is performed.

In step S20, the display controller 26 displays, on the display 14, the associating dialogue 50 (see FIG. 4) for causing the editor to designate the reference document. On the associating dialogue 50, the editor selects the reference document from among the plural non-target documents 20b.

In step S22, the associating unit 28 associates reference document information including a file path, part information, and view mode information of the reference document selected in step S20 with the annotation, which is the edited part, added in step S12.

In a case where a single non-target document 20b is open on the document application 22, in a case where plural non-target documents 20b are open but at least part of one of these non-target documents 20b is copied to the edited part, or in a case where plural non-target documents 20b are open but an attribute of the same kind as an attribute that has been added to one of the non-target documents 20b is added to the edited part of the target document 20a that has the same contents as the one of the non-target documents 20b, it is determined in step S18 that the reference document can be specified and therefore step S24 is performed.

In step S24, the associating unit 28 determines whether or not an in-page part of the reference document which the editor referred to when editing the edited part can be specified. In a case where a single non-target document 20b is open on the document application 22, the in-page part cannot be specified and therefore step S26 is performed.

In step S26, the associating unit 28 associates reference document information including a file path, part information, and view mode information of the reference document specified in step S18 with the annotation, which is the edited part, added in step S12.

In a case where at least part of the non-target document 20b is copied to the edited part or in a case where an attribute of the same kind as an attribute that has been already added to the non-target document 20b is added to the edited part of the target document 20a that has the same contents as the non-target document 20b, it can be determined in step S24 that the in-page part can be specified and therefore step S28 is performed.

In step S28, the associating unit 28 associates reference document information including a file path, part information, and view mode information of the reference document specified in step S18 and in-page part information indicative of the in-page part specified in step S24 with the annotation, which is the edited part, added in step S12.

Although the exemplary embodiment of the present disclosure has been described above, the present disclosure is not limited to the above exemplary embodiment. The exemplary embodiment can be modified in various ways without departing from the spirit of the present disclosure.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
   determine a first document is being edited;
   determine whether a second document is open on a document display application at the same time as the editing of the first document; and
   in response to determining that the second document is open at the same time as the editing of the first document:
      determine whether an edited part of the first document is in the second document;
      associate, with the edited part of the first document displayed on a display, information indicative of a second document different from the first document,
      the information being associated with the edited part of the first document and indicative of the second document comprising at least one of (1) a file path, (2) view mode information including a mode in which the second document was open when the first document was edited, and (3) a part of the second document that was open when the first document was edited; and display the information indicative of the second document on the display when the edited part is of the first document selected.

2. The information processing apparatus according to claim 1, wherein the processor is configured to:

associate, with the edited part, information indicative of a part of the second document that is open on the document display application when the first document is edited; and display the information indicative of the part of the second document on the display when the edited part is selected.

3. The information processing apparatus according to claim 1, wherein a plurality of second documents different from the first document are open on the document display application when the first document is edited; and the processor is configured to associate information indicative of one of the plurality of second documents with an edited part of the first document in a case where at least part of the one of the plurality of second documents is copied to the first document.

4. The information processing apparatus according to claim 3, wherein the processor is configured to:

associate information indicative of an in-page part of the one of the plurality of second documents with the edited part, the in-page part being a part within a page of the one of the plurality of second documents; and display the information indicative of the one of the plurality of second documents including the information indicative of the in-page part on the display when the edited part is selected.

5. The information processing apparatus according to claim 4, wherein the processor is configured to display the second document in which the in-page part is emphasized on the display when the edited part is selected.

6. The information processing apparatus according to claim 1, wherein a plurality of second documents different from the first document are open on the document display application when the first document is edited;

any one of the plurality of second documents has been already edited so that an attribute is added to at least part thereof; and the processor is configured to associate information indicative of the one of the plurality of second documents with an edited part of the first document in a case where an attribute of the same kind as the attribute that has been already added to the at least part of the one of the plurality of second documents is added to the edited part of the first document that has the same contents as the at least part of the one of the plurality of second documents.

7. The information processing apparatus according to claim 6, wherein the processor is configured to:

associate information indicative of an in-page part of the one of the plurality of second documents with the edited part of the first document, the in-page part being a part within a page of the one of the plurality of second documents; and display information indicative of the one of the plurality of second documents including the information indicative of the in-page part on the display when the edited part is selected.

8. The information processing apparatus according to claim 7, wherein the processor is configured to display the second document in which the in-page part is emphasized on the display when the edited part is selected.

9. The information processing apparatus according to claim 1, wherein a plurality of second documents different from the first document are open on the document display application when the first document is edited; and the processor is configured to associate information indicative of a second document designated by an editor among the plurality of second documents with an edited part of the first document.

10. The information processing apparatus according to claim 1, wherein the processor is configured not to associate the information indicative of the second document with the edited part depending on what kind of edit has been made to the first document.

11. The information processing apparatus according to claim 1, further comprising a memory in which a work document storage region is defined, the work document storage region being a region in which documents used for work which an operator is currently tackling are stored, and the documents stored in the work document storage region being displayed concurrently on the display, wherein the processor is configured to associate information indicative of the second document stored in the work document storage region with the edited part in a case where the first document is stored in the work document storage region.

12. A non-transitory computer readable medium storing a program causing a computer to execute a process for information processing, the process comprising:

determining a first document is being edited;

determining whether a second document is open on a document display application at the same time as the editing of the first document; and in response to determining that the second document is open at the same time as the editing of the first document:

determining whether an edited part of the first document is in the second document;

associating, with the edited part of the first document displayed on a display, information indicative of a second document different from the first document, the information being associated with the edited part of the first document and indicative of the second document comprising at least one of (1) a file path, (2) view mode information including a mode in which the second document was open when the first document was edited, and (3) a part of the second document that was open when the first document was edited; and displaying the information indicative of the second document on the display when the edited part of the first document is selected.

13. An information processing apparatus comprising:

processor means for:

determining a first document is being edited;

determining whether a second document is open on a document display application at the same time as the editing of the first document; and in response to determining that the second document is open at the same time as the editing of the first document:

determining whether an edited part of the first document is in the second document;

associating, with the edited part of the first document displayed on a display, information indicative of a second document different from the first document, the information being associated with the edited part of the first document and indicative of the second document comprising at least one of (1) a file path, (2) view mode information including a mode in which the second document was open when the first document was edited, and (3) a part of the second document that was open when the first document was edited; and displaying the information indicative of the second document on the display when the edited part of the first document is selected.

* * * * *